United States Patent [19]

Ramisch

[11] Patent Number: 4,565,511
[45] Date of Patent: Jan. 21, 1986

[54] APPARATUS FOR PRODUCING ARTICLES FROM TWO OR MORE FLOWABLE SYNTHETIC RESIN REACTANTS

[75] Inventor: Heinrich Ramisch, Munich, Fed. Rep. of Germany

[73] Assignee: Krauss-Maffei Aktiengesellschaft, Munich, Fed. Rep. of Germany

[21] Appl. No.: 590,781

[22] Filed: Mar. 19, 1984

[30] Foreign Application Priority Data

Mar. 19, 1983 [DE] Fed. Rep. of Germany ....... 3309964

[51] Int. Cl.$^4$ ............................................. B29B 1/06
[52] U.S. Cl. ..................................... 425/146; 137/98; 222/63; 222/134; 264/328.6; 425/145; 425/543
[58] Field of Search ............... 425/145, 146, 543, 585, 425/586; 137/98, 101.21, 625.4; 417/218; 60/420, 452; 264/328.6; 222/63, 134, 334

[56] References Cited

U.S. PATENT DOCUMENTS

| | | | |
|---|---|---|---|
| 3,908,862 | 9/1975 | Chandra et al. | 264/328.6 |
| 3,985,484 | 10/1976 | Takiura | 425/145 |
| 4,124,333 | 11/1978 | Liesener | 60/445 |
| 4,198,822 | 4/1980 | Miller | 60/445 |
| 4,274,823 | 6/1981 | Stanciu et al. | 425/145 |
| 4,307,760 | 12/1981 | Häuser | 425/145 |
| 4,379,122 | 4/1983 | Taubenmann | 137/625.4 |
| 4,444,704 | 4/1984 | Hira et al. | 264/328.6 |

FOREIGN PATENT DOCUMENTS

| | | |
|---|---|---|
| 1263280 | 3/1968 | Fed. Rep. of Germany ...... 425/146 |
| 2438266 | 2/1975 | Fed. Rep. of Germany ...... 425/146 |
| 2007935 | 6/1976 | Fed. Rep. of Germany . |
| 2837425 | 3/1980 | Fed. Rep. of Germany . |
| 1126873 | 9/1968 | United Kingdom . |
| 2099610 | 12/1982 | United Kingdom . |

OTHER PUBLICATIONS

Davis, Mark A., "Processing Plastics—Servocontrolled Injection Molding", *Plastics Engineering* (Apr. 1977), pp. 26-30.

*Primary Examiner*—Jay H. Woo
*Assistant Examiner*—James C. Housel
*Attorney, Agent, or Firm*—Karl F. Ross; Herbert Dubno

[57] ABSTRACT

An apparatus for producing articles by molding of mixtures of at least two flowable reactive components comprises respective metering units for displacing the components to a mixing head from respective storage vessels with the working pistons of these units being displaced by hydraulic fluid from a common pump through servocontrolled valves respectively following the working pistons to maintain the velocities thereof constant.

9 Claims, 1 Drawing Figure

U.S. Patent  Jan. 21, 1986  4,565,511
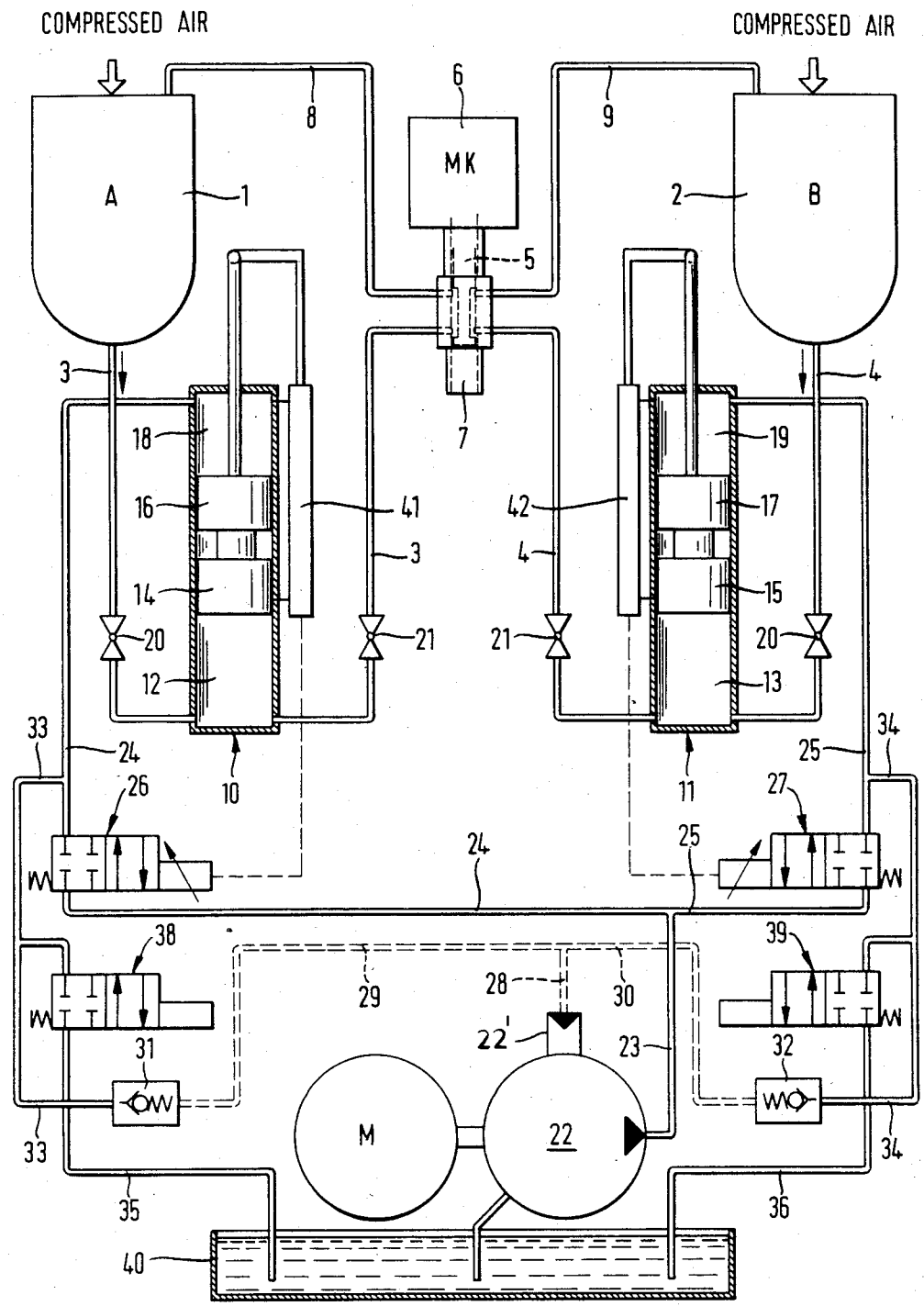

APPARATUS FOR PRODUCING ARTICLES FROM TWO OR MORE FLOWABLE SYNTHETIC RESIN REACTANTS

FIELD OF THE INVENTION

My present invention relates to an apparatus for producing articles from a synthetic resin, and more particularly, to a hydraulically controlled apparatus for producing molded articles from a composition which is formed by the interaction of two flowable reactive synthetic resin components.

BACKGROUND OF THE INVENTION

In the production of molded articles, it is known to supply two reactive resin components, e.g. an isocyanate and a polyol in the case of a polyurethane or an epoxy and a hardener in the case of epoxy resins, to a mixing chamber in which the two flowable reactive components are intimately mixed and discharged from the mixing chamber into a mold in which the synthetic resin composition hardens or sets.

In such systems, e.g. from German open application DE-OS No. 28 37 425, it is known to provide respective supply vessels for the two components and to feed the components to the mixing chamber via dosing or metering cylinders in which respective dosing and metering pistons are displaceable, each of the reactant-displacing pistons being coupled to a working piston displaceable in a working cylinder under hydraulic actuation and for which an appropriate hydraulic control circuit is provided.

In the system of this publication, which is also utilized for production of articles from two component synthetic resin reaction systems, each of the reaction components is fed from a respective supply vessel to the mixing head and from the mixing head can be returned to the supply vessel if the mixing head is of the recirculating type.

The dosing or metering of the respective reactive component is effected by the piston assembly assigned thereto, the displacement rate of the metering piston determining the rate at which the reactive component is positively displaced from the metering cylinder to the mixing head.

The working cylinders of the metering units are connected in a hydraulic circuit so that they are hydraulically energized by respective controllable pumps. A controllable pump, for the purpose of the present description, will be understood to be a pump which is of the variable displacement type, i.e. is driven by a motor but can have the rate of displacement (displacement volume per revolution) varied.

In the system of the type described, a respective pump is provided for each metering cylinder and hence for each component, a common pump for all of the hydraulic circuits being impractical because of the different parameters under which the respective hydraulic circuits operate and especially the different speeds with which the respective working pistons must move to displace the associated reactive component at the proper rate to form the mixture.

This is not to say that it is not known to provide a common pump for a plurality of hydraulic circuits. Indeed, in the earth-moving machine of British Pat. No. 1,126,873, reversible hydraulic pistons which operate the various elements of this machine are supplied by a common pump which has its displacement pressure controlled. In this system the hydraulic circuits are operated by respective manually controlled distributing valves and the controlled pressure for the pump derives from the highest pressure prevalent in a feed line of one of the hydraulic pistons via a check valve.

Mention has been made in the printed British application No. 2,099,610 of an injection-molding machine for synthetic resin materials which has a hydraulic circuit whose mold-closing hydraulic circuit is provided with a volume-control valve controlled by a displacement pickup or a pressure sensor.

In the past a system utilizing separate pumps for respective hydraulic circuits as previously described for producing articles from two component reactive synthetic resin compositions have been used successfully for apparatus with low displacement requirements, e.g. for the production of small articles weighing say 30 to 3,000 grams per piece. However, for larger articles, these systems have proved to be unsatisfactory and in general it has long been desirable to provide in the field of the invention, namely, in the field of molding compositions consisting of reactive synthetic resin components, a way of utilizing a single displacement pump to control the displacement of a plurality of reactive components, each via a respective metering piston and hydraulic circuit in spite of the fact that these pistons are required to move at different rates. Adaptation of these earlier hydraulically-controlled systems to the specific needs of the molding art has not proved successful heretofore to the best of my knowledge.

OBJECTS OF THE INVENTION

It is, therefore, the principal object of the present invention to provide an improved apparatus for producing molded synthetic resin bodies from two or more reactive flowable synthetic resin components under hydraulic control, whereby the above-mentioned drawback is obviated.

Another object of the invention is to provide an apparatus which allows individual metering of respective reactive components in a system of the latter type at different rates with high precision while utilizing a pumping facility of substantially lower cost complexity than has hitherto been considered necessary.

Still another object of my invention is to provide an improved molding apparatus utilizing metering cylinders and working cylinders coupled with the metering pistons which has greater metering precision than has been possible with earlier systems.

SUMMARY OF THE INVENTION

These objects and others which will become apparent hereinafter are attained, in accordance with the present invention, utilizing a hydraulic circuit for the hydraulically-driven working pistons coupled to the respective metering pistons for the respective reactive components which is provided with a single hydraulic variable-displacement pump whose output pressure serves as a control parameter for the pump.

According to the invention, the hydraulic lines connecting the working piston to the output side of this pump are each provided with a branch delivering control pressure to the hydraulic controller of the pump via a respective check valve so that the control pressure for the pump is always the highest of the two pressures applied to the working piston, while each of the working pistons is supplied with hydraulic fluid from the output of the pump via a servovalve following the displacement of the respective working piston, i.e. a volume control valve which varies in its cross section in dependence upon the rate of displacement of the respective working piston, i.e. the velocity thereof. Preferably the control branches with their respective check valves are connected to the lines feeding the working cylinders at a point between the respective servo or volume-control valve and the working cylinder.

The system of the invention thus provides for all hydraulic circuits or networks a common pump whose displacement can be controlled as a function of the displacement pressure, but in combination with volume control valves for each of the hydraulic networks such that these valves operate in response to the speed of the respective working piston. As a consequence, the speed of each metering piston during a displacement stroke is maintained absolutely constant. In spite of the fact that the different components thus must be displaced at different rates, the rate of feed of each of the components to the mixing head is constant during the mixing phase and when the mixing phase is determined and the components are recirculated, although the rate of displacement is then not material. The mixing proportions can then be held constant with great precision.

It should be recognized that in the nonmixing phase each reaction component is returned by the mixing head to the respective supply vessel and thus different flow characteristics are provided along the paths of the compositions than is the case during the mixing phase. In other words, the flow resistances may change markedly. The hydraulic system thus responds in both operating conditions without requiring the use of a pressure relief or bypass valve to set the displacement of the pump to the minimum required for effective displacement. Naturally, even when the working piston is brought to standstill, there is no need for a pressure relief or a bypass valve since the sudden increase in pressure in the control line feeding the hydraulic controller of the pump will automatically reduce the output of the pump to zero. The variable displacement pump can be an axial piston pump whose swash plate is inclined by the hydraulic controller to various degrees establishing the pump displacement.

According to the invention, moreover, the check valves insure that the displacement of the single pump will be controlled in accordance with the dominant displacement pressure of the working pistons driving the metering pistons so that, in spite of the fact that one of the metering pistons may move much more slowly than the other, sufficient displacement and pressure is available to effect the movement of both working pistons. The invention has been found to be effective with mixing devices in which the reaction components are combined at pressures up to 300 bar and with pressure differentials up to 100 bar while generating precise control of the feed of the reaction components, i.e. precision metering thereof in spite of the varying operating parameters and rheology such as viscosity changes. Manually or automatically, it is possible to vary the speed of one or both of the working pistons simply by controlling the response of the respective valve to the working piston follower.

Furthermore, it is an advantage of the present invention that it is possible to increase and decrease the speeds of the pistons for the different stages of operation while assuring in all phases a substantially constant pressure through the automatic control of the valve with the velocity of the piston and the automatic control of the pump by the highest supply pressure to the working piston without delays which may be engendered in other systems because of a switchover of speeds or because of changes in temperature, viscosity and degree of entrainment of air. The setting of a higher velocity than the operating velocity for the return stroke of the working and metering piston thus also shortens the time for feeding the reactive components to the mold.

BRIEF DESCRIPTION OF THE DRAWING

The above and objects, features and advantages of the present invention will become more readily apparent from the following description, reference being made to the sole FIGURE of the accompanying drawing which is a flow diagram illustrating an apparatus of the invention partly in a vertical section.

SPECIFIC DESCRIPTION

In the drawing I have shown a mixing head for two reactive flowable synthetic resin components in which the head can be of the type described in one or more of the following commonly owned U.S. Pat. Nos. 3,706,515, 3,799,199, 3,975,128, 4,226,543 and 4,379,122.

In all of these patents, there are described mixing heads in which two components can be combined upon retraction of a plunger to clear a mixing chamber into which the components are directed at one another from diametrically opposite orifices. When the plunger is advanced, residues are driven out of the mixing chamber and the components are recirculated to the respective supply vessels.

According to the invention, the supply vessels 1 and 2 for the respective reactive components A and B adapted to form a synthetic resin composition are pressurized with compressed air and are connected via respective lines 3 and 4 with such a mixing head M, K which can have a control 6 operated hydraulically or pneumatically for such a plunger 5 which is shown in its recirculating position. When this plunger is retracted or drawn into its upper position, the mixture forms in the mixing chamber and is discharged through an outlet 7 into a mold or the like. In the lower position of the plunger 5 which has been shown, during the nonmixing phase, the components A and B are returned via separate lines 8 and 9 to the respective vessels 1 and 2.

Lines 3 and 4 communicate with respective metering compartments 12 and 13 of respective metering piston units 10 and 11. In these units, the pistons 14 and 15 are respectively displaceable by the working pistons 16 and 17 and suitable check valves 20 and 21 are provided so that, during the intake stroke wherein each set of pistons 14, 16 and 15, 17 moves upwardly, the respective components A or B is admitted to the compartment 12 or 13 while, during downward movement of the respective pump of pistons, backflow to the respective vessel 1 or 2 is blocked and the component is displaced to the mixing head. The displacement toward the mixing head which is effected during the mixing phase can pressurize the respective components to relatively high pressures, e.g. 200 bar or more.

The hydraulic working compartments 18 and 19 of the pistons 16 and 17 are pressurized with hydraulic fluid at such high pressures by a single variable displacement pump 22 which is driving a motor M. While the motor M can be a constant-speed electric motor, the pump 22 can be of the swash plate or axial-piston type and draws the hydraulic fluid from the reservoir 40 to displace it into a pressure line 23 at a volume per revolution which is controlled by the angle of tilt of the swash plate or control surface, which angle of tilt is regulated, in turn, by a hydraulic operator represented at 22' in the drawing.

The pressure medium from the pump 22 is thus delivered by line 23 to a pair of pressure branches 24 and 25, each of which includes a volume control valve 26, 27 which is servo operated or a slave valve whose cross section can be changed at a variable rate as represented by the arrow, in response to a master represented as a linear potentiometer 41 or 42 coupled to the respective sets of pistons 14, 16 and 15, 17. The electronic circuitry, whereby the potentiometer is compared with a setpoint value and the difference is utilized to control the valve, can be of any type conventional in servomechanism systems (see *Servomechanism Practice,* McGraw Hill Book Co., New York, 1960). This electronic system is shown by broken lines connecting the potentiometer with the respective valve in the drawing.

The displacement of the pump is controlled by its displacement pressure and to this end, the hydraulic control input 28 of the pump is connected with two pressure-applying lines 29, 30 which are branched at 33 and 34 from the lines 24 and 25, respectively, between the respective volume-control valve 26 and 27 and the respective working compartment 18 or 19. Between the pipes 33 and 34 and the respective pipes 29 and 30, respective check valves 31 and 32 are provided and are arranged so that the higher pressure of those present in lines 33 and 34 will be applied via line 28 to the operator 22'.

In addition, branches 35 and 36 with piston-reversing valves 38 and 39 are provided between the lines 33 and 34 and the reservoir 40.

Once the desired setpoint values which control the relative rates of displacements of the two components are set at the valves 26 and 27, the apparatus operates so that the valves 38 and 39 in blocking position, the compartments 12 and 13 filled with the respective components and the piston sets in their upper positions, valves 26 and 27 admit hydraulic fluid at respective flow rates to the compartments 18 and 19 to drive the components A and B into the mixing head. During this time, the displacement rate of the pump is controlled by the higher of the two pressures at lines 33 and 34. The potentiometer-control feedback for each valve 26, 27 maintains a constant velocity for each of the two metering pistons 14 and 15 during the mixing phase even though the speeds of the two pistons may differ.

During the return stroke of the pistons, effected by the pressure of the reactive component and the compressed air applied to the vessels 1 and 2, the distributing valves 38 and 39 are shifted to their other positions. Naturally, as shown, all of the valves can be four-port valves if, instead of using compressed air for the return stroke of the pistons, hydraulic fluid reversal is desired and the pump 22 is to effect the displacement. During the upward movements of the pistons, the hydraulic medium can flow from the compartments 18 and 19 into the reservoir 40. Obviously, during pressurization the higher of the pressure at lines 33 and 34 will be applied to line 28 through the respective open check valve 31 or 32, the other check valve being closed.

I claim:

1. An apparatus for producing molded articles from a mixture of two flowable reactive synthetic resin components, said apparatus comprising:

respective supply vessels for each of said components;

a mixing head for receiving said components, mixing same and discharging a mixture of said components into a mold;

a metering unit connected between each of said vessels and said mixing head, said metering unit comprising a metering piston for displacing the respective component and a working piston connected to the respective metering piston for displacing same, each of said units having a working compartment to which a pressure medium can be fed to displace the respective working piston;

a single variable displacement pump common to both of said units and provided with a hydraulic operator for varying the displacement of said pump as a function of a control pressure, said pump having a pressure line;

respective volume control valves connected between said pressure line and said working compartments;

a respective servocontroller connected between each of said working pistons and the respective volume control valve for operating same in accordance with the velocity of the respective working piston to maintain said velocity constant during a displacement stroke wherein the respective component is displaced by the respective unit to said mixing head for mixing therein with the other component; and hydraulic lines including respective check valves communicating with the respective working compartments and with said operator for actuating said operator with the higher of the pressures applied to said working compartments, said mixing head comprising a plunger displaceable between a position wherein a mixing chamber is freed to enable mixing of said components and a position wherein each of said components is recycled to the respective vessel.

2. The apparatus defined in claim 1 wherein each of said vessels is pressurized under gas pressure.

3. The apparatus defined in claim 1 wherein each of said servocontrollers is a respective linear potentiometer and electronically controls the respective volume control valve by comparison with said point value settable therefor.

4. The apparatus defined in claim 2 wherein each of said servocontrollers is a respective linear potentiometer and electronically controls the respective volume control valve by comparison with said point value settable therefor.

5. The apparatus defined in claim 1, further comprising a respective reversing valve connected between each of said working compartments and a reservoir supplying the pump.

6. The apparatus defined in claim 4, further comprising a respective reversing valve connected between each of said working compartments and a reservoir supplying the pump.

7. The apparatus defined in claim 1 wherein said hydraulic lines communicate with said working compartments between said units and the respective volume control valves.

8. The apparatus defined in claim 6 wherein said hydraulic lines communicate with said working compartments between said units and the respective volume control valves.

9. The apparatus defined in claim 8 wherein said reversing valves are connected to said hydraulic lines.

* * * * *